United States Patent
Schroeder et al.

(10) Patent No.: US 6,636,036 B1
(45) Date of Patent: Oct. 21, 2003

(54) SENSOR WITH SIGNAL AMPLITUDE ADAPTIVE HYSTERESIS

(75) Inventors: Thaddeus Schroeder, Rochester Hills, MI (US); John Wesley Hile, Lake Orion, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/030,144

(22) Filed: Feb. 25, 1998

(51) Int. Cl.[7] .................. G01B 7/00; G01R 33/06; H01L 43/08
(52) U.S. Cl. .................. 324/207.21; 324/207.12
(58) Field of Search .................. 324/207.12, 207.2, 324/207.21, 251, 252; 327/67, 187, 205, 510

(56) References Cited

U.S. PATENT DOCUMENTS

| | | | |
|---|---|---|---|
| 3,636,767 A | * 1/1972 | Duffy | 324/174 |
| 4,293,814 A | * 10/1981 | Boyer | 324/207.12 |
| 4,868,909 A | 9/1989 | Lowel | 324/225 |
| 5,192,877 A | 3/1993 | Bittebierre et al. | 307/309 |
| 5,483,162 A | 1/1996 | Ushikoshi et al. | 324/252 |
| 5,532,583 A | 7/1996 | Davis et al. | 324/202 |
| 5,548,242 A | * 8/1996 | Yasuda et al. | 327/559 |
| 5,585,775 A | * 12/1996 | Ishishita | 324/207.21 |
| 5,633,486 A | 5/1997 | Burg et al. | 325/449 |

FOREIGN PATENT DOCUMENTS

EP 0580207 A 1/1994

* cited by examiner

Primary Examiner—Walter Snow
(74) Attorney, Agent, or Firm—Margaret A. Dobrowitsky

(57) ABSTRACT

In a magnetoresistive sensor employing a single stage comparator circuit for signal threshold detection, an hysteresis deadband is established substantially proportional to signal amplitude. The sensor includes a transducer comprising at least one magnetoresistive element and an hysteresis circuit also including the at least one magnetoresistive element.

15 Claims, 2 Drawing Sheets

SENSOR WITH SIGNAL AMPLITUDE ADAPTIVE HYSTERESIS

TECHNICAL FIELD

The present invention is related to high accuracy rotation sensing apparatus.

BACKGROUND OF THE INVENTION

Magnetoresistive sensing apparatus are widely employed to discern rotational information for use in automotive powertrain control applications. Information such as cam shaft speed and absolute angular position are derived from voltage signals generated in response to resistive changes in one or more magnetoresistive (MR) elements placed in proximity to a permanent magnet and to a rotating target wheel or reluctor having predefined patterns of alternating high and low permeability regions.

In the simplest case, a single MR element may be used in generating a voltage signal which is compared to a reference voltage threshold which when crossed triggers output states indicating the proximity of high or low permeability regions of the reluctor. The transition edges of the output states correspond substantially to the end of one and beginning of another permeability region passing beneath the MR element. Such single element configurations generally do not provide the angular accuracy required in modern engine controls and suffer from well known temperature sensitivity shortfalls.

It is, however, common practice to employ a pair of matched MR elements in a differential signal processing mode to minimize or counteract the inherent temperature sensitivity effects of MR elements in general and particularly in the dynamic range of temperature experienced in internal combustion engine applications. Other benefits aside from temperature insensitivity are provided by such dual MR element configurations including improved angular accuracy. Furthermore, it is common practice to provide a buffer stage in front of a comparator stage having a set amount of hysteresis to provide robust noise immunity and rapid analog to digital signal conversion.

Two general differential signal processing configurations for a pair of MR elements include single and dual input amplification. In single input amplification, the input signal corresponds to the common node voltage between a pair of MR elements coupled in series between a voltage source. The input signal in this type of configuration directly corresponds to the resistance differential of the pair of MR elements and the amplification provides appropriate scaling and buffering of the signal. In dual input amplification, a two input differential amplifier receives an input signal at each input corresponding to voltage across a respective one of a pair of MR elements. Each MR element in this type of configuration is individually coupled in series with a matched current source. The input signals in this type of configuration correspond to the individual resistances of the pair of MR elements, and the amplification provides an appropriately scaled and buffered signal corresponding to the resistance differential of the pair of MR elements.

Subsequent to the single or dual input amplification, a comparator stage compares the scaled and buffered signal to a preset reference threshold. The reference threshold includes a conventional deadband or hysteresis band preset in accordance with anticipated noise amplitude or signal overshoot due to transition edge effect phenomenon.

Aside from the signal processing configurations described, two general configurations of MR element and target wheel interfacing are known. In a so called single track configuration, a pair of MR elements is disposed at the outer periphery of a rotating target wheel having a singular pattern of angularly alternating low and high permeability regions such that angular progression of the target wheel pattern is sensed first by one then by the other of the pair of MR elements. In this configuration, each MR element is angularly separated from the other with no axial offset along the rotational axis of the target wheel. In a so called dual track configuration, a pair of MR elements is disposed at the outer periphery of a rotating target wheel having a pair of axially separated complementary or mirror-image patterns of angularly alternating low and high permeability regions such that angular progression of the target wheel patterns are coincidentally sensed by the MR elements. In this configuration, each MR element is co-angular with respect to the axis and axial offset one from the other along the rotational axis of the target wheel. Such single and dual track configurations are disclosed for example in co-pending U.S. patent application Ser. No. 08/701,254 also assigned to the assignee of the present invention.

Generally, any combination—including hybrids thereof—among the two general differential signal processing configurations and the two general configurations of MR element and target wheel interfacing described above may be employed. However, certain shortfalls are inherent in any combination of the known processing and hardware configurations. It is well known that the signal amplitude produced by MR based sensors varies significantly with the air gap between the MR elements and target wheel. Tight tolerancing of the air gap between the MR elements and the target wheel may be required to ensure that the signal amplitude will always be of appropriate magnitude for accurate and repeatable detection. In other words, the maximum air gap must be carefully controlled or the signal may not be detected to indicate rotational position of the target wheel. Similarly, the minimum air gap may be required to be carefully controlled or noise which scales proportionately with the signal amplitude may inappropriately indicate detection of a rotational position. For example, with respect to a single track configuration, signal overshoot due to transition edge effects being proportional to signal amplitude may cause erroneous rotational position indication if the air gap is too small. Additionally, the air gap tolerance band must be limited lest the slew rate differential between signals generated at opposite ends of the air gap tolerance band results in unacceptable angular inaccuracy of detected rotational position of the target wheel. In this regard, detection of small signals generated at large air gaps would lag detection of large signals generated at small air gaps and vice-versa.

SUMMARY OF THE INVENTION

In accordance with the present invention, a sensing apparatus detects transitions between relative states of a transducer. The transducer is characterized by a transducer output having an amplitude envelope which modulates with the operating region of the excitation stimulus. A comparator circuit has a pair of inputs into which a reference circuit provides a reference signal and a transducer circuit provides a transducer signal proportional to the transducer output. An hysteresis circuit adapts to the operating region of the transducer and provides an hysteretic deadband to the response characteristics of the comparator circuit proportional to the amplitude envelope.

The transducer may comprise one or more magnetoresistive elements responsive to the modulation of magnetic flux therethrough. Preferably, pairs of magnetoresistive elements are employed to take advantage of differential signal processing and attendant common mode cancellation effects.

In preferred implementations, magnetoresistive elements provide voltage signals to a voltage comparator. The voltage signal swings peak to peak in a characteristic fashion in response to the changes in flux density through the magnetoresistive elements. The peak to peak swings occur within an amplitude envelope which modulates in magnitude in accordance with the operating region of the flux density. A circuit, preferably including one of the magnetoresitive elements, provides an amount of hysteresis to the response characteristics of the comparator such that the hysteretic deadband is substantially proportional to the amplitude envelope of the voltage signal.

BRIEF DESCRIPTION OF THE DRAWINGS

The present invention will now be described by way of example with reference to the accompanying drawings in which.

DESCRIPTION OF THE PREFERRED EMBODIMENT

Figure 1:
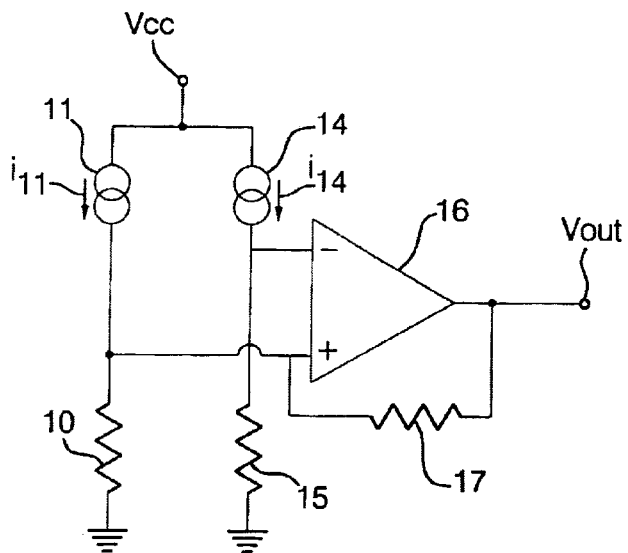
FIGS. 1 and 2 are schematic illustrations of first and second embodiments of the present invention.
Figure 2:
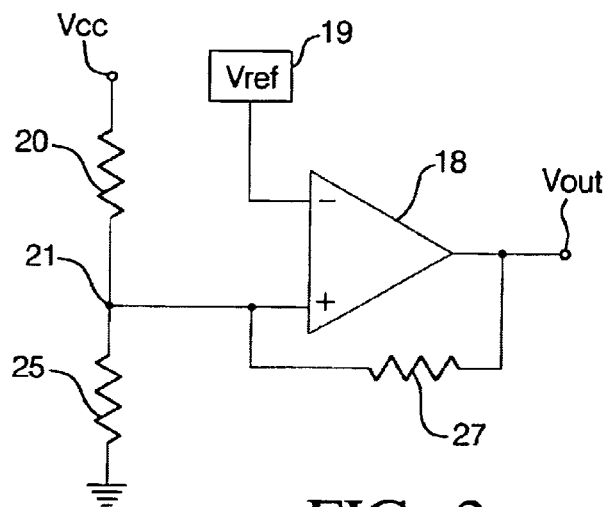

With reference initially to FIGS. 1 and 2, schematic representations of alternative embodiments of the present invention are illustrated. A pair of semiconductor magnetoresistor elements, for example 10 and 15 of FIG. 1 or 20 and 25 of FIG. 2, are employed as sensing elements in a stationary portion of a rotation sensor. The rotation sensor would further comprise a reluctor or target wheel, not part of the stationary portion of the sensor, but placed in spaced adjacency to the stationary portion of the rotation sensor. The target wheel includes peripherally disposed regions of alternating relative permeabilities such as obtained with a tooth/slot arrangement as is well known in the art. The stationary portion of the rotation sensor would further include a source of magnetic flux, typically a permanent magnet with poles oriented substantially normal to the target wheel tangent, and arranged such that the magnetoresistive elements are intermediate the target wheel periphery and the permanent magnet. As the target wheel rotates and the areas of alternating relative permeabilities pass beneath the respective magnetoresistive elements the magnet flux density passing through the elements modulates between relatively high and low values.

In a so called single track arrangement the pair of magnetoresistive elements 10 and 15 would be aligned such that the target wheel serially presents the areas of relative alternating permeablities beneath the elements. Therefore, the magnetic flux density change through one of the magnetoresistive elements leads the similar magnetic flux density change through the other of the magnetoresistive elements. In a so called dual track arrangement each of the pair of magnetoresistive elements 10 and 15 would conventionally be aligned with a respective axially-adjacent track such that angularly coincident areas of permeablities are simultaneously presented beneath the elements. Therefore, the magnetic flux density change through each one of the magnetoresistive elements is substantially responsive to the respective track immediately beneath the respective element. Such dual track arrangements typically embody so called mirror image tracks wherein each track is characterized by angularly alternating areas of relative permeability and wherein angularly-coincident axially-adjacent regions are characterized by alternate relative permeabilities. Alternative dual track target wheels are known which provide one track with angle invariant permeability and an axially-adjacent track which provides angularly alternating areas of relative permeability.

In each type of generally described arrangement, either of the embodiments of FIG. 1 or 2 provides for differential processing of transduced signals from the magnetoresistive elements. Differential processing is generally preferred for various reasons including self-correction for temperature sensitivity, air gap variations, and magnetic degradation through common mode cancellation and, at least with respect to the dual input arrangement of the embodiment of FIG. 1, angular accuracy advantages. It is, however, an option to substitute for magnetoresistive elements 15 and 20 a fixed resistance thus eliminating the differential processing advantages of dual magnetoresistive arrangements.

In the embodiment of FIG. 1, DC current sources 11 and 14 are used to source currents "$i_{11}$" and "$i_{14}$" through respective magnetoresistive elements 10 and 15 thus impressing voltages across each element proportional to their respective resistances. Current sources 11 and 14 may take any known form including for example a controlled current source as described in U.S. Pat. No. 5,404,102 also assigned to the assignee of the present invention. The voltage across magnetoresistive element 10 is input to the non-inverting input of comparator circuit 16 and the voltage across magnetoresistive element 15 is input to the inverting input of comparator circuit 16. In the embodiment of FIG. 2, DC voltage source $V_{CC}$ is impressed across the series combination of magnetoresistive elements 20 and 25 with the voltage at the common node 21 being input to the non-inverting input of comparator circuit 18 and a reference voltage $V_{ref}$ being input to the inverting input of the comparator circuit 18 from reference voltage generator 19. Reference voltage generator 19 may for example be a regulated DC voltage source. Preferably, each respective pair of magnetoresistive elements comprises matched elements having equivalent resistances when excited by equivalent flux densities thereby providing for zero differential offset.

Figure 3:
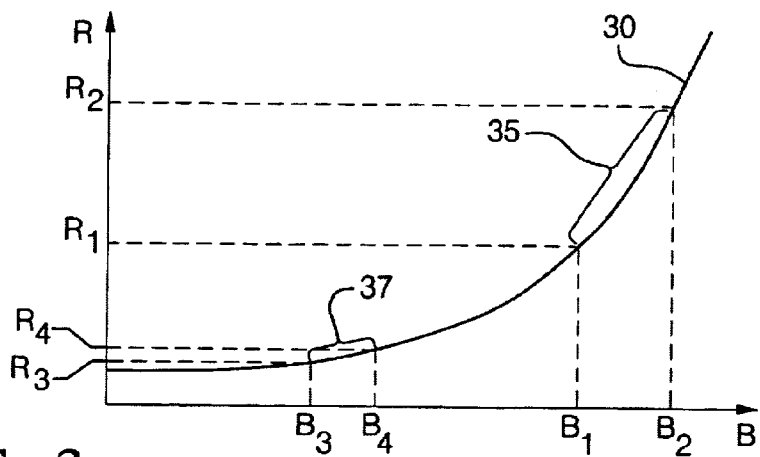
FIG. 3 is an operating curve illustrative of the characteristic resistance variation through magnetoresistive elements versus magnetic flux density variation.

FIG. 3 is illustrative of the characteristic resistance variation through magnetoresistive elements plotted vertically (R) versus magnetic flux density variation plotted horizontally (B) to define an operating curve 30. Generally, as magnetic flux density through a magnetoresistive element increases, so too does the resistance of the magnetoresistive element. The relationship is as indicated non-linear with the slope or rate of resistance change increasing as flux density increases. A magnetoresistive based rotation sensor will have an operating point defined as a region along such a curve through which the magnetic flux density and hence the resultant magnetoresistive resistance modulates. For example, the region labeled 35 along the curve 30 in FIG. 3 corresponds to magnetoresistive element excitation between relatively high flux density modulation limits labeled $B_1$, and $B_2$ along the horizontal axis which results in relatively high resistance modulation limits $R_1$ and $R_2$. The upper flux density and resistance limits, $B_2$ and $R_2$, would correspond in the exemplary application to a rotation sensor to the magnetoresitive element having a region of high relative permeability (i.e. tooth of a target wheel) therebeneath, while the lower flux density and resistance limits, $B_1$, and $R_1$, would similarly correspond to the magnetoresitive element having a region of low relative permeability (i.e. gap or root of a target wheel) therebeneath. The repetitive alternate presentation of the low and high relative permeability regions beneath the magnetoresitive element therefore results in movement along the curve 30 between the respective flux density and resistance limits. In the same fashion, the region labeled 37 along the curve 30 in FIG. 3 corresponds to magnetoresistive element excitation between relatively low flux density modulation limits labeled $B_3$ and $B_4$ along the horizontal axis which results in relatively low resistance modulation limits $R_3$ and $R_4$ resulting from the repetitive alternate presentation of low and high relative permeability regions beneath the magnetoresitive element.

In the application to a rotation sensor at hand, the only difference between an arrangement exhibiting the operating point 35 and an arrangement exhibiting the operating point 37 is the air gap between the magnetoresistive element and the periphery of the target wheel. Operating point 35 corresponds to a relatively small air gap while operating point 37 corresponds to a relatively large air gap. The distance between the top of a tooth and the root surface of a slot of the target wheel is the same among the two illustrated operating points. This being the case, the flux density differentials $B_2-B_1$ and $B_4-B_3$ caused by equivalent tooth/slot presentations beneath the magnetoresistive element but at different air gaps are not equivalent. It is apparent from examination of the two flux density differentials that the one corresponding to the smaller air gap is larger. In other word, aside form the air gap difference all else being equal, $B_2-B_1>B_4-B_3$. This is consistent with the non-linearity which flux density exhibits versus air gap. It can be appreciated then that the air gap of such an exemplary rotation sensor is inversely correlated to both the magnitude of the magnetoresistive resistance and the resistance differential due in part to the non-linearity of resistance versus flux density and in part to the non-linearity of flux density versus air gap. It follows then that identical arrangements differ in their sensitivity to the relative permeabilities with a non-linear and inverse correspondence to the air gap. Operating points on the operating curve may hereafter be referred to as low and high sensitivity operating points in accordance with their relative positions on the operating curve as described.

Figure 4A:
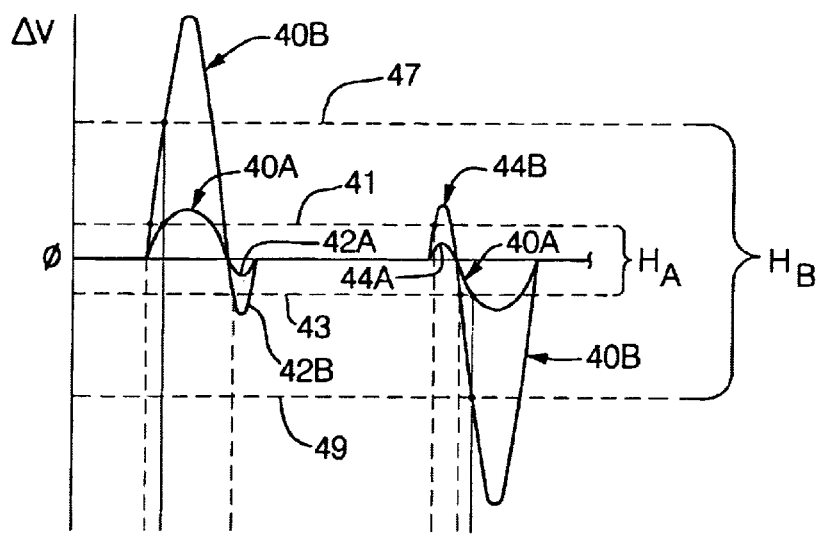
FIGS. 4A and 4B show differential voltages and comparator outputs, respectively, for either of the exemplary embodiments illustrated in FIGS. 1 and 2, wherein flux density through respective pairs of magnetoresistive sensors change in a non-phase coincident fashion; and, FIGS. 5A and 5B show differential voltages and comparator outputs, respectively, for either of the exemplary embodiments illustrated in FIGS. 1 and 2, wherein flux density through respective pairs of magnetoresistive sensors change in a phase coincident fashion.

A magnetoresistive rotation sensor of the single track variety previously described wherein each one of a pair of magnetoresitive elements serially encounters relative flux density transitions provides transition detection as a function of the resistance differential of the magnetoresistive elements. Either of a dual or single input amplification configurations would produce signals substantially as illustrated in FIG. 4A wherein the vertical axis corresponds to the resistance differential of such a pair of magnetoresistive elements. In accordance with use of magnetoresistive elements to provide a transduced voltage signal, the vertical axis represents a voltage proportional to the resistance differential. The horizontal axis represents angular progression of a target wheel as it rotates completely through a single tooth. A representation of the differential voltage provided by a dual magnetoresistive element sensor characterized by a relatively large air gap (i.e. having a low sensitivity operating point) is labeled 40A in FIG. 4A and is overlaid with a transduced voltage signal provided by a dual magnetoresistive element sensor characterized by a relatively small air gap (i.e. having a high sensitivity operating point) labeled 40B. References to the differential voltages of FIG. 4A are to be understood to be applicable to either of the arrangements of FIGS. 1 and 2.

Figure 4B:
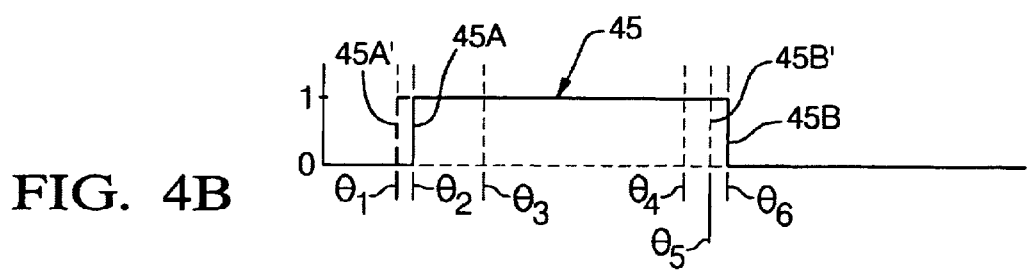

FIG. 4B illustrates along the horizontal axis common with FIG. 4A angular progression of a target wheel as it rotates completely through a single tooth. Desirably, the slot to tooth transition is to be coincident with the angular demarcation labeled $\theta_2$ and the tooth to slot transition is to be coincident with the angular demarcation $\theta_6$. The solid trace labeled 45 corresponds to a desired digital signal high from transition to transition as described. Hence, the rising edge 45A of such a signal 45 marks the desired angular demarcation labeled $\theta_2$ while the falling edge 45B thereof marks the desired angular demarcation labeled $\theta_6$. Angular events or positions may thereby be correlated to the desired angular demarcations for a variety of control and encoding purposes.

Provision of the digital signal is by comparator means such as voltage comparator circuits 16 and 18 shown in the arrangements of FIGS. 1 and 2. Unless otherwise specifically set forth, reference to a comparator is to be understood to apply to either comparator circuit 16 or 18, each being understood to accomplish an analogous function with respect to the differential voltage of the respective dual magnetoresistive element sensor as described. Generally, the respective outputs $V_{out}$ of comparator circuits 16 and 18 are at a relatively high voltage to correspond to the high digital signal state and at a relatively low voltage to correspond to the low digital signal state. A voltage at the non-inverting input of a comparator which exceeds the voltage at the inverting input of the same comparator causes a high $V_{out}$ whereas a voltage at the inverting input of the comparator which exceeds the voltage at the non-inverting input thereof causes a low $V_{out}$.

The exemplary illustrations of FIGS. 4A and 4B suggest that it is the respective magnetoresitive elements 10 and 25 which lead the detection of relative permeability transitions in the illustrated exemplary angular progression from $\theta_1$ to $\theta_6$. Hence, beginning from some angle $\theta_2^-$, whereat both magnetoresistive elements are over a slot and the differential voltage is substantially nil, the leading magnetoresitive element encounters the transition from slot to tooth the voltage at the non-inverting input of the comparator rises. Hence the differential voltage is also seen to increase positively as exemplified by traces 40A and 40B of FIG. 4A. Each trace is seen to peak and then decline as the trailing magnetoresistive element encounters the transition from slot to tooth and the voltage at the inverting input of the comparator rises. Now, both magnetoresistive elements are over a tooth and the differential voltage is again substantially nil. And then, continuing through an angular progression of the target wheel to some angle $\theta_6^-$, the leading magnetoresitive element next encounters the transition from tooth to slot and the voltage at the non-inverting input of the comparator falls. Hence the differential voltage is also seen to increase negatively as exemplified by traces 40A and 40B of FIG. 4A. Each trace is seen to peak and then decline as the trailing magnetoresistive element encounters the transition from tooth to slot and the voltage at the inverting input of the comparator falls.

In the single track serial arrangement currently described, associated with each slot to tooth and tooth to slot transition are respective edge effects which manifest in the voltage differential 40A and 40B as lagging or leading edge effect voltage differentials 42A, 42B and 44A, 44B depending upon the particular transition.

Generally, the comparator is tripped into a state when a voltage differential is presented between the inverting and non-inverting inputs as described. This general response is modified with a degree of hysteresis to address false detections due to high gain instability, signal noise, and edge effects in the case of single track arrangements. For large air gap signals 40A an hysteresis band $H_A$ provides an appropriate upper threshold 41 which provides rising edge 45A of signal 45 coincident with angle desired $\theta_2$ bearing a known relationship to target wheel position. Similarly, hysteresis band $H_A$ provides an appropriate lower threshold 43 which provides falling edge 45A of signal 45 coincident with desired angle $\theta_6$ also bearing a known relationship to target wheel position. While examination of FIGS. 4A and 4B demonstrate with particularity avoidance of false transition indications by large air gap signal 40A edge effect voltage differentials 42A and 44A, they also demonstrate the inappropriateness of the hysteresis band $H_A$ for smaller air gap signals such as 40B. Signals such as 40B may in fact cause angular inaccuracies due to rise time differential between large and small air gap signals as shown by the rising edge 45A' and falling edge 45B' at angles $\theta_1$ and $\theta_5$ respectively which undesirably lead the desired detection angles $\theta_2$, and $\theta_6$ respectively. Additionally, false transition indications may be caused since edge effect voltage differentials scale proportionately with the differential voltage signal. Hence the edge effect voltage differentials 42B and 44B associated with signals such as 40B may in fact cause false tooth to slot and slot to tooth transition indications such as those illustrated coincident with angles $\theta_3$ and $\theta_4$ respectively.

Similarly, for small air gap signals 40B an hysteresis band $H_B$ provides an appropriate upper threshold 47 which provides rising edge 45A of signal 45 coincident with desired angle $\theta_2$ bearing a known relationship to target wheel position. And hysteresis band $H_B$ provides an appropriate lower threshold 49 which provides falling edge 45A of signal 45 coincident with desired angle $\theta_6$ also bearing a known relationship to target wheel position. Avoidance of false transition indications by large air gap signal 40A edge effect voltage differentials 42B and 44B are demonstrated in FIGS. 4A and 4B with respect to hysteresis band $H_B$. However, in analogous fashion to the inappropriateness of hysteresis band $H_A$ for small air gap signals 40B, FIGS. 4A and 4B also demonstrate the inappropriateness of the hysteresis band $H_B$ for larger air gap signals such as 40A. Signals such as 40A may in fact cause angular inaccuracies manifested as transition indications at angle lagging the desired angles $\theta_2$ and $\theta_6$ due to rise time differential between large and small air gap signals if in fact the signal triggers the comparator at all. As shown by exemplary large air gap signal 40A in conjunction with hysteresis band $H_B$, the differential voltage fails to trigger the comparator thus failing to provide any transition indication whatsoever.

In accordance with the present invention, a hysteresis band is provided that adapts to the triggering signal. In the illustrated embodiments utilizing voltage comparator circuits 16 and 18, the adaptive hysteresis band is accomplished through an arrangement of hysteresis circuit elements which include a magnetoresistive element. The hysteresis circuit in the embodiments of FIGS. 1 and 2 include the respective magnetoresistive element 10 or 25 and a respective feedback resistor 17 or 27. Accordingly, the hysteresis bands $H_1$ and $H_2$ for the embodiments of FIGS. 1 and 2 respectively are substantially proportional to the respective ratio of the corresponding magnetoresitive element resistance and feedback resistor as follows:

$H_1 \alpha MR_{10}/R_{27}$ $H_1 \alpha MR_{25}/R_{27}$ wherein MR and R are resistance values and the subscripts thereto correspond to like numbered elements in the embodiments of FIGS. 1 and 2. The resistance value of the magnetoresistive elements $MR_{10}$ and $MR_{25}$ are known to assume values as a function of the flux density therethrough. Hence, by examination of the curve of FIG. 3, it can be seen that as the operating region of the flux density changes, for example as a function of air gap, so too does the resultant resistance of the magnetoresistive element. Provision of such an adaptive hysteresis band results in substantial angular coincidence of transition indication as born out by examination of FIGS. 4A and 4B wherein an adaptive hysteresis band comprises for the exemplary large and small air gap signals 40A and 40B the limits bounded by hysteresis bands $H_A$ and $H_B$ respectively, and the transition indications occur at the desired angles $\theta_2$ and $\theta_6$. Intermediate air gap signals would of course be associated with correspondingly intermediate hysteresis bands though not separately illustrated.

Of course, the amplitude envelope, or alternatively stated the peak to peak amplitude, of the signal will vary in relation to the air gap in the present exemplary application. More generally, the amplitude envelope will vary in relation to the operating point of the sensor. In the present case, the operating point is considered to be the region of the flux density versus resistance curve for a magnetoresistive element as described with respect to FIG. 3. Furthermore, any sensing apparatus employing transducers, magnetoresistive or otherwise, responsive to an excitation stimulus for providing a transducer output having an amplitude envelope that modulates in accordance with the operating region of the excitation stimulus may benefit from the adaptive hysteretic advantages of the present invention.

Figure 5A:
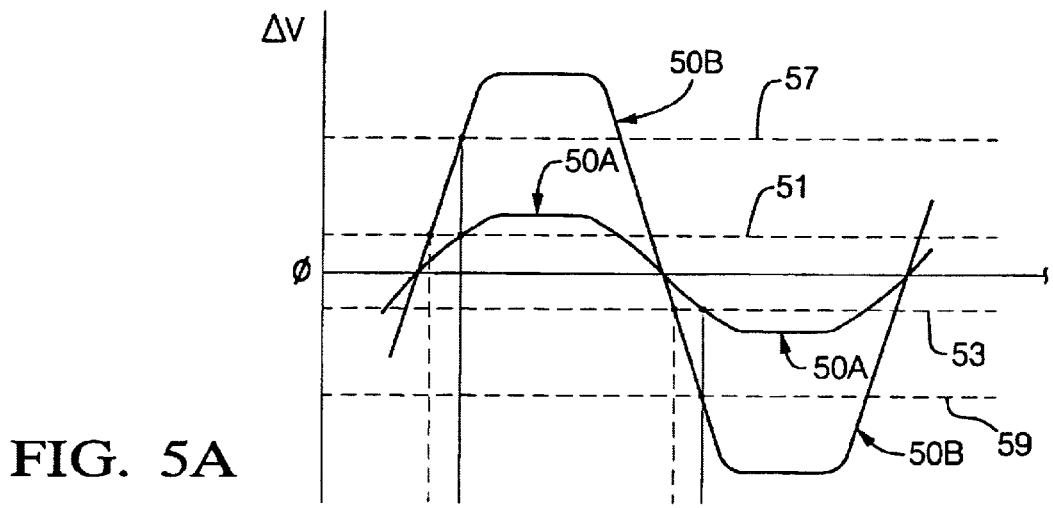

A magnetoresistive rotation sensor of the dual track variety previously described wherein each one of a pair of magnetoresitive elements coincidentally encounters relative flux density transitions provides transition detection as a function of the resistance differential of the magnetoresistive elements. The vertical and horizontal axes of FIGS. 5A represent the same quantities as similarly described with respect to FIGS. 4A. Similarly then, a representation of the differential voltage provided by a dual magnetoresistive element sensor characterized by a relatively large air gap (i.e. having a low sensitivity operating point) is labeled 50A in FIG. 5A and is overlaid with a transduced voltage signal provided by a dual magnetoresistive element sensor characterized by a relatively small air gap (i.e. having a high sensitivity operating point) labeled 50B. References to the differential voltages of FIG. 5A are to be understood to be applicable to either of the arrangements of FIGS. 1 and 2.

Figure 5B:
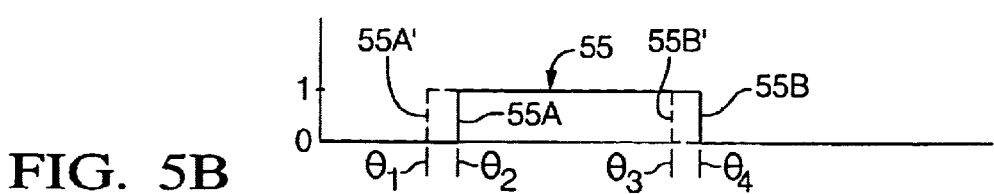

FIG. 5B however illustrates along the horizontal axis common with FIG. 5A angular progression of a target wheel as it rotates completely through a single tooth and adjacent slot pattern. Desirably, the pattern transition from a first mirror image pattern to a second inverse mirror image pattern is to be coincident with the angular demarcation labeled $\theta_2$ and the transition from the second mirror image pattern back to the first inverse mirror image pattern is to be coincident with the angular demarcation $\theta_4$. The solid trace labeled 55 corresponds to a desired digital signal high from transition to transition as described. Hence, the rising edge 55A of such a signal 55 marks the desired angular demarcation labeled $\theta_2$ while the falling edge 55B thereof marks the desired angular demarcation labeled $\theta_4$. Angular events or positions may thereby be correlated to the desired angular demarcations for a variety of control and encoding purposes.

Provision of the digital signal is by comparator means such as voltage comparator circuits 16 and 18 shown in the arrangements of FIGS. 1 and 2 and as previously described with respect to the single track arrangement. A great portion of the operation of the circuits of FIG. 1 and 2 is therefore not repeated herein.

With reference to FIGS. 4A and 4B, beginning from some angle $\theta_{2-}$, it can be inferred that the magnetoresistive element 10 or 25 is initially over a slot and the magnetoresistive element 15 or 20 is over a tooth, the voltage at the inverting input is greater than the voltage at the non-inverting input and hence the differential voltage is at this angular orientation substantially negative. As the magnetoresitive elements encounter the transition to a mirror image pattern the voltage at the non-inverting input of the comparator rises, the voltage at the inverting input of the comparator falls, and the differential voltage is seen to increase positively as exemplified by traces 50A and 50B of FIG. 5A. Each trace is seen to peak and hold through an angular duration until the next mirror image pattern transition. Then, at some angle $\theta_{6-}$ whereat the next mirror image pattern transition occurs, the voltage at the non-inverting input of the comparator falls, the voltage at the inverting input of the comparator rises, and the differential voltage is seen to decrease as exemplified by traces 50A and 50B of FIG. 5A.

Once again, the general response characteristics of the comparator is modified with a degree of hysteresis to address high gain instability, signal noise, and in accord with the present invention amplitude envelope modulation shortfall including angular inaccuracy and missed transition detection. For large air gap signals 50A, the adaptive hysteresis provides an appropriate upper threshold 51 provides for rising edge 55A of signal 55 coincident with angle desired $\theta_2$ bearing a known relationship to target wheel position. Similarly, an appropriate lower threshold 53 provides for falling edge 55A of signal 55 coincident with desired angle $\theta_4$ also bearing a known relationship to target wheel position. Examination of FIGS. 5A and 5B demonstrate the inappropriateness of these upper and lower thresholds 51 and 53 for smaller air gap signals such as 50B which may in fact cause angular inaccuracies due to rise time differential between large and small air gap signals as shown by the rising edge 55A' and falling edge 55B' at angles $\theta_1$ and $\theta_3$ respectively which undesirably lead the desired detection angles $\theta_2$ and $\theta_4$ respectively.

Similarly, for small air gap signals 50B an appropriate upper threshold 57 provides for rising edge 55A of signal 55 coincident with desired angle $\theta_2$ bearing a known relationship to target wheel position. And, an appropriate lower threshold 59 provides for falling edge 55A of signal 55 coincident with desired angle $\theta_4$ also bearing a known relationship to target wheel position. However, in analogous fashion to the inappropriateness of the hysteresis limits 51 and 53 for small air gap signals 50B, FIGS. 5A and 5B also demonstrate the inappropriateness of the hysteresis limits 57 and 59 for larger air gap signals such as 50A. Signals such as 50A may in fact cause angular inaccuracies manifested as transition indications at angles lagging the desired angles $\theta_2$ and $\theta_4$ due to rise time differential between large and small air gap signals if in fact the signal triggers the comparator at all. As shown by exemplary large air gap signal 50A in conjunction with hysteresis limits 57 and 59, the differential voltage fails to trigger the comparator thus failing to provide any transition indication whatsoever.

Therefore, a dual track configuration similarly benefits from the adaptive hysteretic deadband provided in accord with the present invention as described previously with respect to the exemplary embodiments of FIGS. 1 and 2. Such an adaptive hysteretic deadband results in substantial angular coincidence of transition indication as born out by examination of FIGS. 5A and 5B wherein an adaptive hysteretic deadband results in the transition indications occurring substantially at the desired angles $\theta_2$ and $\theta_6$ regardless of the amplitude envelope of the differential signal.

While the embodiments of the invention have been set forth to include a pair of magnetoresistive sensors in a differential signal processing scheme, certain applications may not require the benefits afforded by such dual element arrangments. For example, where temperature drift is minimal for a particular application, a single magnetoresistive arrangement may be preferred. As such, it is recognized that the magnetoresistive element labeled 15 in the embodiment of FIG. 1 and the magnetoresistive element labeled 20 in the embodiment of FIG. 2 may have substituted therefor a fixed resistance value. Such single magnetoresistive element arrangements as described would produce substantially the same characteristic voltage as the signals illustrated in FIG. 5A wherein the voltage signal only changes in angular correspondence to the transitions from one relative permeability to the other. The present invention finds equal application with such single element arrangements and yields the same benefits as those described with respect to dual element configurations.

In the described preferred embodiments of the invention, an active magnetoresistive element, that is to say a magnetoresistive element which is included as a portion of the magnetoresistive transducer providing a voltage signal, forms part of the hysteresis circuit providing the hysteretic deadband. A magnetoresistive element separate from, and not forming a part of, the magnetoresistive transducer may form part of the hysteresis circuit providing the hysteretic deadband. A separate magnetoresistive element so employed will preferably to subjected to substantially the same operating region on its respective operating curve as the operating region of the active magnetoresistive element(s) of the transducer such that its resistance will change substantially proportionally to the resistance changes in the active magnetoresistive element(s).

While the present invention has been described with respect to certain preferred embodiments and alternatives thereof, it is recognized that certain modifications and implementations of the invention may be apparent to those having ordinary skill in the art. Hence, the described embodiments found herein are intended to be non-limiting illustrations of practical implementations of the invention, the scope of which is to be limited only with respect to the claims appended hereto.

What is claimed is:

1. An apparatus configured to detect transitions between, first and second relative states of a transducer responsive to an excitation stimulus configured to provide a transducer output having an amplitude envelope that modulates in accordance with the operating region of the excitation stimulus comprising:

a comparator circuit having at least two inputs and at least one output for providing a two state output signal wherein state changes of the output signal correspond to state changes of the transducer;

a reference circuit configured to provide a reference signal to one of the pair of inputs of the comparator circuit;

a transducer circuit configured to provide a transducer signal proportional to the transducer output to the other of the pair of inputs of the comparator circuit; and, a hysteresis circuit configured to provide a hysteretic deadband proportional to the amplitude envelope of the transducer output to the response of the comparator circuit to the reference and transducer signals.

2. An apparatus as claimed in claim 1 wherein said transducer comprises a magnetoresistive element.

3. An apparatus as claimed in claim 1 wherein said transducer comprises first and second magnetoresistive elements coupled in series across a voltage, and said transducer output comprises the voltage at the common node between the series coupled magnetoresistive elements.

4. An apparatus as claimed in claim 1 wherein said transducer comprises a first magnetoresistive element characterized by current sourced therethrough and said transducer output comprises the voltage across the first magnetoresistive element, said apparatus further comprising a second magnetoresistive element characterized by current sourced therethrough wherein said reference input comprises the voltage across the second magnetoresistive element.

5. An apparatus for detecting transitions between first and second relative resistance states of a magnetoresistive transducer responsive to local magnetic flux density configured to provide a transducer output voltage having an amplitude envelope that modulates in accordance with the operating region of the magnetic flux density, comprising:

a comparator circuit having respective inverting and non-inverting inputs, and an output providing a comparator output voltage wherein state changes of the comparator output voltage correspond to relative resistance state changes of the magnetoresistive transducer;

a reference circuit configured to provide a reference voltage signal to one of inputs of the comparator circuit;

a transducer circuit configured to provide a transducer voltage signal proportional to the transducer output voltage to the other of the inputs of the comparator circuit; and a hysteresis circuit configured to provide a hysteretic deadband proportional to the amplitude envelope of the transducer output voltage to the response of the comparator circuit to the reference and transducer voltage signals.

6. An apparatus as claimed in claim 5 wherein said magnetoresistive transducer comprises first and second magnetoresistive elements coupled in series across a voltage and said transducer output voltage comprises the voltage at the common node between the series coupled magnetoresistive elements.

7. An apparatus as claimed in claim 5 wherein said transducer comprises a first magnetoresistive element characterized by current sourced therethrough and said transducer output voltage comprises the voltage across the first magnetoresistive element, said apparatus further comprising a second magnetoresistive element characterized by current sourced therethrough wherein said reference voltage signal comprises the voltage across the second magnetoresistive element.

8. An apparatus as claimed in claim 6 wherein said transducer voltage signal is provided to the non-inverting input of the comparator circuit and said hysteresis circuit comprises one of the first and second magnetoresistive elements and a feedback resistor coupled between the non-inverting input of the comparator circuit and the output of the comparator.

9. An apparatus as claimed in claim 7 wherein said transducer voltage signal is provided to the non-inverting input of the comparator circuit, said reference voltage signal is provided to the inverting input of the comparator circuit, and said hysteresis circuit comprises the first magnetoresistive element and a feedback resistor coupled between the non-inverting input of the comparator circuit and the output of the comparator.

10. An apparatus as claimed in claim 7 wherein said transducer voltage signal is provided to the inverting input of the comparator circuit, said reference voltage signal is provided to the non-inverting input of the comparator circuit, and said hysteresis circuit comprises the second magnetoresistive element and a feedback resistor coupled between the non-inverting input of the comparator circuit and the output of the comparator.

11. An apparatus as claimed in claim 5 wherein said transducer comprises a magnetoresistive element characterized by current sourced therethrough and said transducer output voltage comprises the voltage across the magnetoresistive element, said transducer voltage signal is provided to the non-inverting input of the comparator circuit, said reference voltage signal is provided to the inverting input of the comparator circuit, and said hysteresis circuit comprises the magnetoresistive element and a feedback resistor coupled between the non-inverting input of the comparator circuit and the output of the comparator.

12. An apparatus as claimed in claim 11 wherein said reference circuit comprises a fixed resistive element characterized by current sourced therethrough and said reference voltage signal comprises the voltage across the fixed resistive element.

13. An apparatus as claimed in claim 5 wherein said magnetoresistive transducer comprises a magnetoresistive element and a fixed resistive element coupled in series across a voltage and said transducer output voltage comprises the voltage at the common node between the series coupled magnetoresistive elements.

14. An apparatus as claimed in claim 13 wherein said transducer voltage signal is provided to the non-inverting input of the comparator circuit and said hysteresis circuit comprises the magnetoresistive element and a feedback resistor coupled between the non-inverting input of the comparator circuit and the output of the comparator.

15. A sensing circuit, comprising:
   a. least one MR sensor outputting signals defining an amplitude envelope;
   at least one comparator electrically connected to the MR sensor,
   at least one reference circuit providing a reference signal to the comparator; and
   at least one hysteresis circuit providing a hysteretic deadband that adapts to a triggering signal, the MR sensor establishing a portion of the hysteresis circuit.

* * * * *